Jan. 30, 1945.　　　G. W. HAYTER　　　2,368,299
CENTRIFUGAL CLUTCH
Filed April 6, 1943　　　2 Sheets—Sheet 1
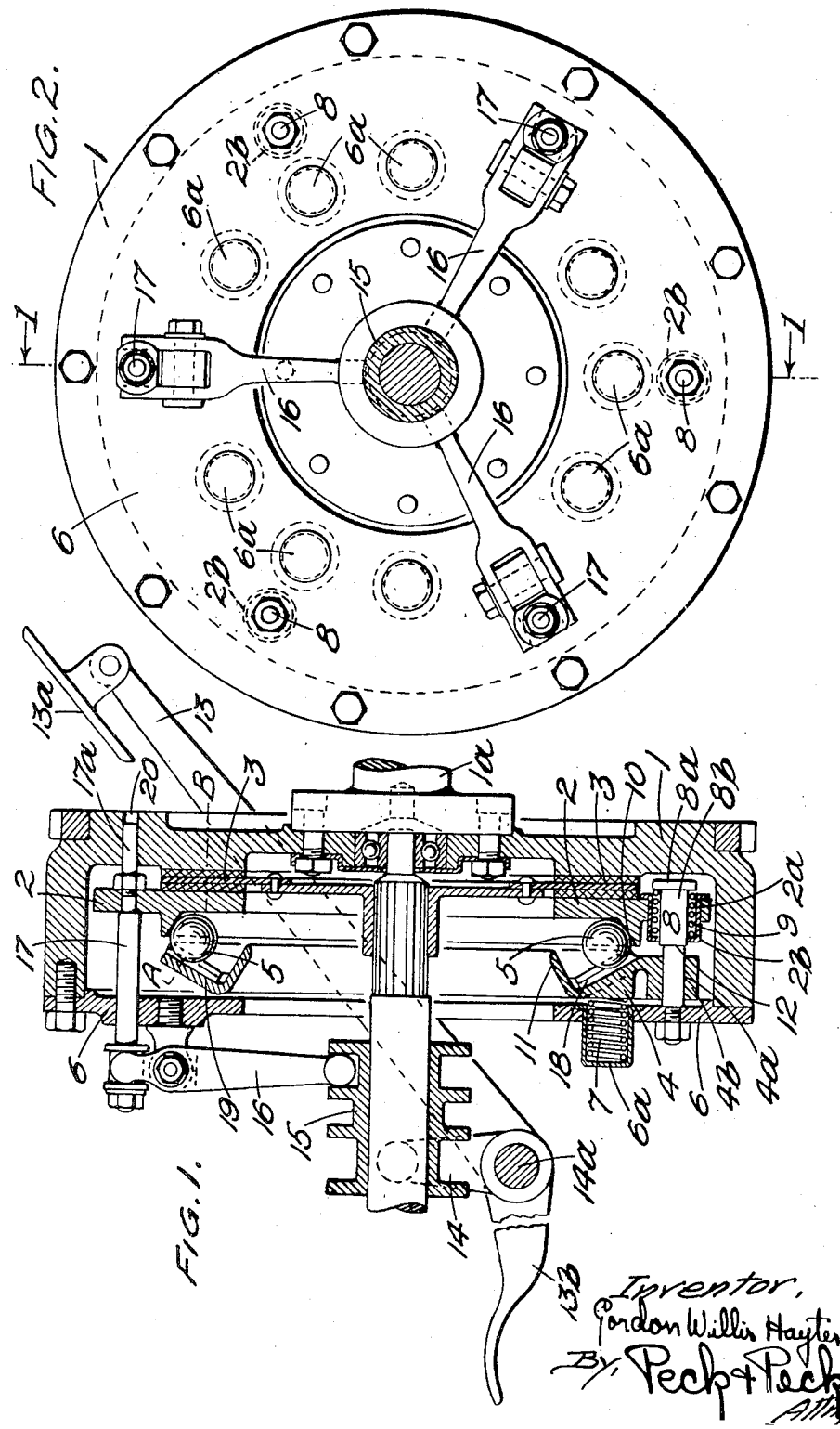
Inventor,
Gordon Willis Hayter
By Peck & Peck
Attys Jan. 30, 1945. G. W. HAYTER 2,368,299
CENTRIFUGAL CLUTCH
Filed April 6, 1943 2 Sheets-Sheet 2
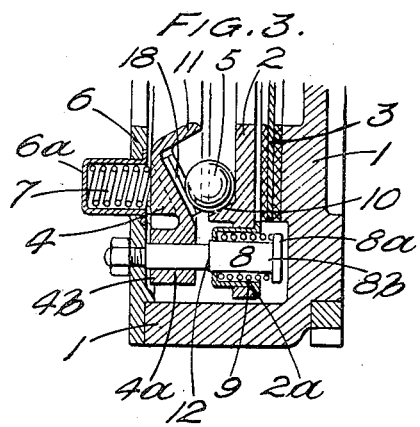
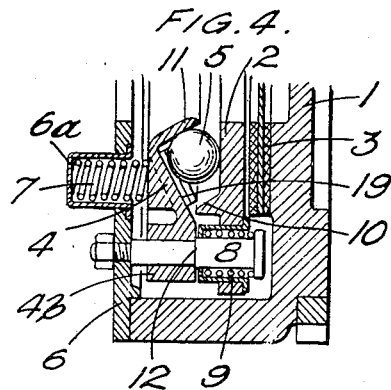
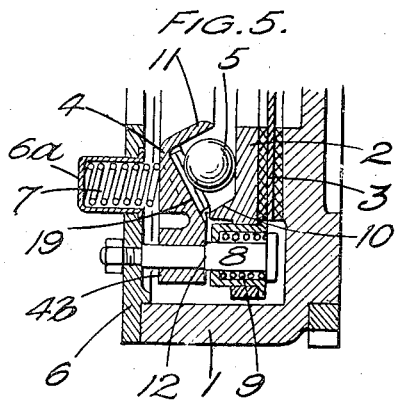
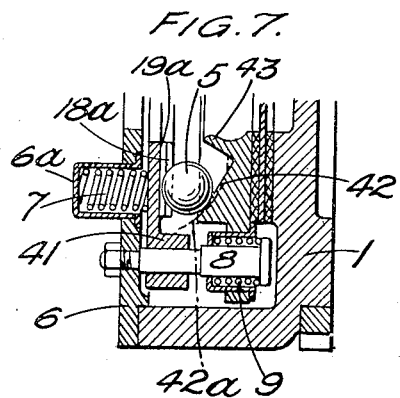
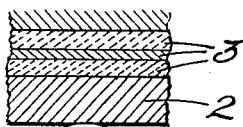
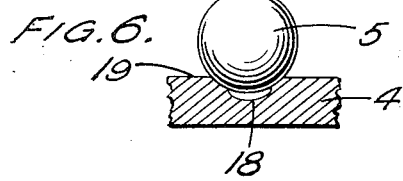

Patented Jan. 30, 1945

2,368,299

UNITED STATES PATENT OFFICE 2,368,299

CENTRIFUGAL CLUTCH

Gordon Willis Hayter, Ravensworth Park, near Gateshead-on-Tyne, England

Application April 6, 1943, Serial No. 482,023
In Great Britain April 25, 1942

5 Claims. (Cl. 192—103)

This invention relates to centrifugal clutches of the type (hereinafter referred to as the "type specified") comprising rotary driving and driven members, clutch-elements of the friction-plate type adapted when urged into operative engagement to transmit a drive between the said members, and centrifugal loading means carried by the driving member and arranged to produce operative engagement of the clutch-elements when the driving member is rotating at above a given speed.

It has been appreciated that it is desirable in such clutches to provide means whereby the clutch may be engaged manually while the driving member is stationary or rotating at below the given speed and various proposals have been made to this end.

The object of the present invention is to provide a clutch of the type specified which shall have improved means whereby the clutch may be engaged or disengaged at will irrespective of the speed of rotation of the driving member.

According to the invention, in a clutch of the type specified, the centrifugal loading means is constituted by weights disposed between a carrier member rotating with the driving member and a pressure plate adapted to act upon the clutch-elements and means is provided whereby the pressure plate may be manually operated either in the direction for engaging the clutch or in the direction for disengaging the clutch irrespective of the speed of rotation of the driving member, provided that in the former case the clutch be not already engaged.

When the weights are ball-weights the carrier member may be constructed as an annular member having radial grooves of a width substantially less than the diameter of the balls so that the latter when supported by the edges of the grooves do not touch the bottoms of the same, although this is not essential, and an example of the improved clutch embodying such a carrier member will now be described in greater detail with reference to the accompanying drawings, wherein—

Fig. 1 is an axial section of the clutch, taken on the line I—I of Fig. 2, showing the parts in the normal clutch-engaged position produced by the action of the centrifugal weights alone, Fig. 2 is an end view of the clutch taken from the left of Fig. 1, some parts being omitted for the sake of clearness, Fig. 3 is a fragmentary sectional view, corresponding to the lower part of Fig. 1, showing the parts in the clutch-disengaged position produced by operation of the manual means while the centrifugal weights are in their clutch-engaging position, Fig. 4 is a similar view showing the parts in the normal clutch-disengaged position produced by the action of the centrifugal weights alone, Fig. 5 is a similar view showing the parts in the clutch-engaged position produced by operation of the manual means while the centrifugal weights are in their clutch-disengaged position, Fig. 6 is a fragmentary sectional view, to a larger scale, taken on the line A—B of Fig. 1, and Fig. 7 is a view similar to Fig. 3 illustrating a modified form of carrier member and pressure plate.

The friction-clutch elements 3 and pressure plate 2 are mounted within an engine flywheel 1, secured to the crank-shaft 1a, in usual fashion and a series of ball-weights 5 (only two are shown in Fig. 1) is disposed between the free face of the pressure plate 2 and a carrier member 4 mounted adjacent a cover 6 for the open end of the flywheel 1. The pressure plate 2 is of annular form and is formed with a number of apertures 2a near its periphery each receiving a cup 2b open towards the flywheel and containing a spring 9 which bears at one end on the base of the cup 2b and at the other end on the head 8a of a stepped bolt 8 having a larger diameter part 8b located axially of the spring. These bolts 8 are continued as smaller diameter parts, through closely fitting apertures 4a formed in lugs 4b extending outwardly from the carrier member 4, to be secured in the flywheel cover 6. Between the latter and the carrier 4 are arranged springs 7 (located in cups 6a on the cover 6) tending to hold the carrier 4 against the shoulders 12 formed on the bolts 8 at the junctions of the larger and smaller diameter parts thereof and the springs 9 contained in the cups 2b mounted in the pressure plate 2 normally hold the latter spaced away from the friction-clutch elements 3 with the bases of the cups 2b almost bearing on the lugs 4b of the carrier member 4 (see Fig. 4). In this position of the parts, the flywheel being at rest, the ball-weights 5 are in their innermost positions. They are then resting on a flange 11, formed on the internal edge of the carrier member 4 to extend towards the pressure plate 2, and also on the edges of radial grooves 18 formed in a conical surface 19 on the carrier 4 which is inclined outwardly towards the pressure plate 2. The balls 5 also contact the adjacent surface of the latter.

When the flywheel 1 is rotated at above a given speed, the ball-weights 5 move outwardly along the grooves 18 and force the carrier 4 and pressure plate 2 apart, causing each member to move against the action of its springs, until the pressure plate 2 causes engagement of the friction-clutch element 3. In this position of the parts (shown in Fig. 1) the balls rest against an inwardly extending stop flange 10 formed on the free face of the pressure plate 2.

In order to provide for manual disengagement of the clutch irrespective of the speed of the flywheel, a pedal 13a is provided, together with the necessary levers 13, 14, mounted on a transverse pivot 14a, collar 15 and toggle levers 16 of usual construction as shown in Fig. 1 which is adapted, when depressed, to cause the pressure plate 2 to be moved axially away from the friction-clutch elements 3. This movement also causes displacement of the carrier member 4 in the same direction against the action of its springs 7, due to the balls 5 being in their outermost positions, when the flywheel is rotating at above the given speed (see Fig. 3). Release of the pedal 13a permits of the clutch being re-engaged under the action of the springs 7.

It may be necessary, however, to engage the clutch when the flywheel 1 is stationary and, for this purpose, the pedal lever 13 is formed with a a tail 13b (Fig. 1) so that depression of the latter will cause movement of the pressure plate 2 axially towards the friction-clutch elements 3 and bring about the engagement of the latter. The carrier member 4 naturally tends to follow up this movement, under the action of its springs 7, but is arrested after a short travel by striking the shoulders 12 on the stepped bolts 8 (see Fig. 5). The result is that release of the tail 13b of the pedal permits dis-engagement of the clutch, under the action of the springs 9 disposed in the cups 2b, provided that the flywheel 1 is still stationary or only rotating at a low speed.

The movement of the pedal 13a is transmitted directly to the pressure plate 2 through the medium of the usual levers 13, 14, collar 15 and toggle levers 16 and a number of pins 17 which are secured at their one ends in the pressure plate 2 and extend parallel with the axis of the clutch through the cover 6 of the flywheel 1 to be engaged at their other ends with the said toggle levers 16. The pins 17 are extended at 17a beyond the pressure plate 2 to engage guide apertures 20 formed in the flywheel 1 (Fig. 1).

As can be seen from Fig. 6, the grooves 18 in the conical surface 19 of the carrier member 4 are of a width substantially less than the diameter of the balls 5 so that the latter when supported by the edges of the grooves do not touch the bottoms of the same. By virtue of this construction any wear that occurs at the edges of the grooves is taken up automatically and there is no possibility of "rattle" developing in the clutch.

Fig. 7 shows a modification in which the surface 19a of the carrier member 41, which corresponds to the surface 19 of the carrier member 4 of the previous description, is at right angles to the axis of the clutch. It is formed with radial grooves 18a corresponding to those marked 18 in Figs. 1 to 6 and the balls 5 besides resting on the edges of these grooves also bear on a conical surface 42 formed on the free side of the pressure plate 2 and inclined outwards towards the carrier member 41. In this arrangement an annular stop ring or flange 43 is formed on the inner edge of the pressure plate to extend towards the carrier member 41 and fulfill the function of the flange 11 of Figs. 1 to 5.

If desired, as indicated by the broken line 42a in Fig. 7, the surface 42 may have a concave curvature transversely in order to increase the speed of engagement of the clutch, for an equal outward movement of the balls 5, compared with a clutch having a plain conical surface at the corresponding location.

What I claim is:

1. A centrifugal clutch comprising rotary driving and driven members, clutch-elements of the friction-plate type adapted when urged into operative engagement to transmit a drive between the said members, a carrier member rotatable with the driving member, a pressure plate adapted to act upon the clutch-elements, centrifugal weights disposed between the carrier member and the pressure plate and adapted to become operative to produce engagement of the said clutch-elements automatically when the driving member is rotating at above a given speed, spring means urging the carrier member towards a position in which it would cause the pressure plate to engage the clutch-elements were the centrifugal weights operative, stop means carried by the driving member for preventing the carrier member from moving under the action of said spring means beyond a position in which the pressure plate will still allow disengagement of the clutch-elements when the weights are or become inoperative, further spring means tending to urge the carrier member and pressure plate towards each other, and manually operated means positively connected to the pressure plate whereby the latter may be moved either away from the carrier member in order to engage the clutch or towards the carrier member in order to disengage the clutch.

2. A clutch according to claim 1, wherein the means for manually operating the pressure plate includes a lever which carries a pedal for facilitating the moving thereof in one direction and a tail-piece extending beyond the pivot for the lever for facilitating the moving of the latter in the other direction.

3. A clutch according to claim 1, wherein the centrifugal weights are ball-weights and the carrier member is of annular form with radial grooves of a width substantially less than the diameter of the balls so that the latter when supported by the edges of the grooves do not touch the bottoms of the same.

4. A clutch according to claim 1, wherein the carrier member is urged towards the pressure plate and the clutch-elements by spring means reacting against a part secured to the driving member and the pressure plate is urged towards the carrier member and away from the clutch-elements by spring means reacting against a second part secured to the driving member.

5. A clutch according to claim 1, wherein the carrier member is urged towards the pressure plate and the clutch-elements by spring means reacting against a part secured to the driving member and the pressure plate is urged towards the carrier member and away from the clutch-elements by spring means reacting against a second part secured to the driving member, the said second part also serving to limit the movement of the carrier member in the direction of the clutch-elements.

GORDON WILLIS HAYTER.